Dec. 8, 1953
L. P. EVANS
2,662,005
GASEOUS FUEL PRODUCTION
Filed Jan. 12, 1953
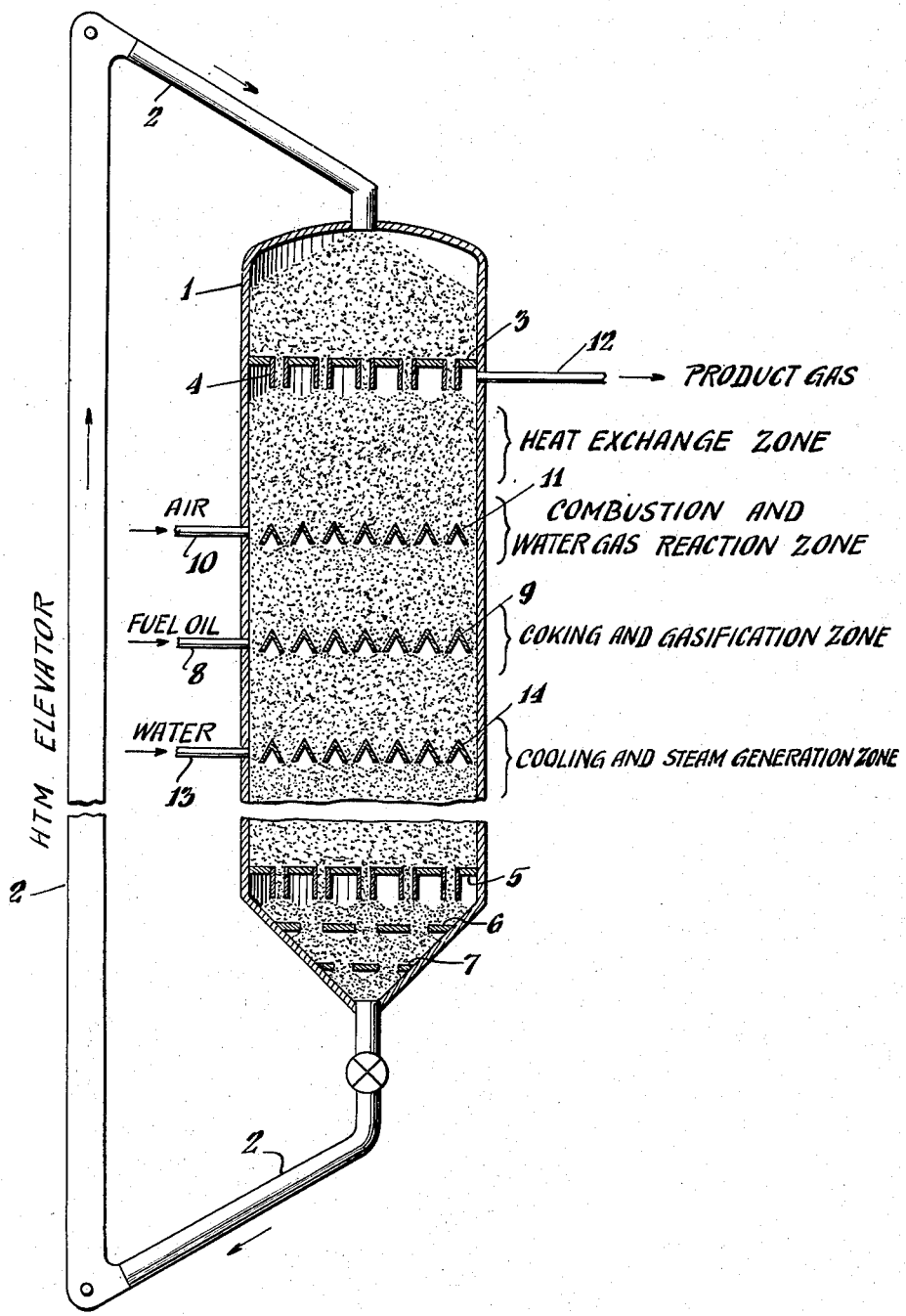
INVENTOR.
Louis P. Evans Patented Dec. 8, 1953

2,662,005

UNITED STATES PATENT OFFICE 2,662,005

GASEOUS FUEL PRODUCTION

Louis P. Evans, Woodbury, N. J., assignor to Socony-Vacuum Oil Company, Incorporated, a corporation of New York Application January 12, 1953, Serial No. 330,840

5 Claims. (Cl. 48—197)

This invention has to do with the production of gaseous fuels and, more particularly, has to do with the gasification of hydrocarbon oils to produce gaseous fuels for industrial and utilities use.

It is an object of this invention to efficiently produce gaseous fuels in a single reaction vessel of simple construction. It is a further object of this invention to provide an improved process whereby gaseous fuels are produced by the conversion of hydrocarbon oils in such a reaction vessel. Other objects will become apparent from the following description.

It has now been found that the foregoing objects are realized by employing a modified Thermofor Pyrolytic Cracking (TPC) technique. The TPC technique is well known in the art, having been described in the literature, for example in the Oil and Gas Journal, August 26, 1948, and in numerous domestic patents, such as: 2,432,503; 2,432,962; 2,436,254; 2,437,383; 2,439,730; 2,444,274; 2,445,554; 2,448,257; 2,448,922; 2,513,294; 2,513,995 and 2,519,315.

In contrast to the TPC operations hitherto described, the present invention involves the use of a single reaction vessel, which does not have internally sealed zones. The present invention involves the use of a circulating solid heat transfer medium which serves successively, in the reaction vessel, to effect: heat recovery, coking and gasification of hydrocarbon charge, and steam generation by direct contact with water charge.

The invention may be more readily understood by reference to the attached drawing which is an elevational view in section of a preferred embodiment. It will be recognized that the drawing is highly diagrammatic in form.

A granular solid heat transfer material (HTM), such as refractory pebbles, coke particles or fused alumina pellets of about 0.3 inch in diameter, is circulated through reactor 1 by means of elevator 2. A plate 3 in the top of reactor 1 provides a bulk supply hopper in the top of the reactor from which hot HTM passes downwardly by feed pipes 4 to provide a compact moving bed in the several zones identified hereinafter. Flow control plates 5, 6 and 7 are provided in the bottom of reactor 1 in order that the HTM can be uniformly withdrawn for return via elevator 2 or other suitable lifting means to the top of the reactor for recycling in the system.

Residual oil, preferably one boiling above 800° F., is injected as a cold liquid, from line 8 to an intermediate section of reactor 1 directly onto the HTM. The fuel oil is distributed across the HTM by inverted angles 9. This intermediate section of the reactor is designated as "coking and gasification zone," inasmuch as the temperature therein is sufficient to cause complete gasification and vaporization of the liquid fuel oil, and to cause some dry coke to be deposited upon the HTM. The temperature of this zone is maintained between about 1000° F. and about 2000° F., preferably 1200 to 1700° F.

The hydrocarbon vapors or gases formed in the coking and gasification zone pass upwardly in reactor 1, countercurrent to the HTM, into a combustion zone into which air (or oxygen) is injected via line 10. Here too, air is distributed across the HTM by inverted angles 11. The temperature of the combustion zone is maintained between about 1200° F. to about 2500° F., preferably 1600 to 2000° F., with oxygen reacting with the hydrocarbon gases and with any coke on the HTM. The amount of oxygen introduced to the combustion zone via line 10 is less than sufficient for complete combustion of the hydrocarbons and coke present in this zone, such that, with the temperatures prevailing therein, carbon monoxide is the primary reaction product rather than water and carbon dioxide. The principal reactions occurring in this zone are, therefore:

(1) 
Hydrocarbon+O₂→CO+H₂ and (2) Carbon+O₂→CO 

It is to be recognized, of course, that minor amounts of carbon dioxide and water are generally formed together with the principal products, carbon monoxide and hydrogen.

The product gases flow upwardly through the reactor and are removed from the system through line 12. In flowing from the combustion and water gas reaction zone, the product gases are in countercurrent relationship to the HTM, in a heat exchange zone at the top of the reactor 1. In this zone, a partial regeneration of the HTM takes place, that is, part of the carbon or coke deposited thereon is burned to support the water gas reaction, and the remainder enters into the water gas reaction:

$$H_2O+C \rightarrow CO+H_2$$ 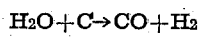

The HTM can enter the top of the reactor at a temperature of about 100 to 1200° F., and thus abstract heat from the product gases before the latter are removed from the system and before the HTM flows downwardly to the combustion and water gas reaction zone.

The HTM leaving coking and gasification zone passes downwardly through a cooling and steam generation zone near the bottom of reactor 1. Liquid water is injected, through line 13 and inverted angles 14, directly onto the HTM. The water serves two purposes: (1) to cool the HTM and to permit the HTM to effect heat recovery in the top of the reactor where it extracts the superheat in the product gases, and (2) to generate steam. The temperature in this zone is maintained below about 1000° F. The steam so generated rises up through the reactor, joins with the hydrocarbon gases in the gasification zone, and finally enters into the water gas reaction with these hydrocarbon gases, and any coke, in the high temperature (1600 to 2000° F.) combustion and water gas reaction zone. Thus, the steam is converted to carbon monoxide and hydrogen, which constitutes part of the product gas. In other words, the total product gas removed through line 12, comprises: (a) hydrocarbon gases from the fuel oil gasification operation, (b) carbon monoxide and hydrogen from the water gas reaction, and (c) carbon monoxide and nitrogen from the combustion reaction.

This invention, as illustrated above, has many advantageous features. For example, it makes possible a heat balanced unit wherein the heat of combustion of carbon on the HTM is utilized in the water gas reaction. The need for waste heat boilers or any such economizers is eliminated, since direct heat exchange between cold HTM and product gases in the top of the reactor results in almost complete heat recovery. Also, since quenching of product gas takes place in the reactor, no extraneous quencher is required. In addition, the use of a single vessel as a reactor and as a regenerator eliminates the need for a seal system between two vessels as have been required in earlier systems; this results in a substantial reduction in overall height of the equipment. Incomplete and controlled regeneration of carbon on the HTM is desirable and necessary in this system to permit the water gas reaction with steam, thus resulting in better conversion efficiency. Further, the use of a single vessel makes possible conduction of the reaction under higher pressures (no seal systems involved), which is conducive to more favorable reaction equilibria.

The granular heat transfer material employed in the process of this invention should be a solid material having a relatively low or substantially no catalytic cracking activity, a high heat absorption capacity and it should be capable of withstanding high temperatures of the order of 2000–2500° F. without severe breakage, cracking or attrition. The material can be non-porous, for example, metallic pieces or balls. Preferably, however, the solid material should be porous, for example, natural clays which have become deactivated so as to have a very low activity as a cracking catalyst. Other materials which can be employed are pumice, mullite, fused alumina, silica, etc. A preferred heat carrying material is granular petroleum coke. The granular material can range in size from about 100 mesh Tyler up to about one inch in diameter, preferably of the order of one-eighth to one-quarter inch diameter. The term "granular" is employed herein in a broad sense as including solids in various shapes and forms such as pellets, tablets, spheres, and irregular shaped particles.

It is to be understood, however, that although heat transfer materials of little or no catalytic cracking activity are preferred herein, as indicated above, it is also contemplated that catalytically active materials can be used. For example, metallic catalyst compositions, such as nickel, iron, copper and others which promote the desired reactions and yet which retain stability at high temperatures, can be used.

Although the invention is illustrated above by the conversion of a residual oil having a boiling range above 800° F., it is to be understood that any hydrocarbon fraction from and including ethane to and including residual oils can be used herein. As a note of caution, it will be recognized by those skilled in the art that higher temperatures and longer contact times are to be used in converting the lower molecular weight charges, such as an ethane, than in similarly converting a heavy hydrocarbon oil. A particularly advantageous hydrocarbon charge is a residual-type fuel oil and with such a charge it is preferred that the following reaction conditions be maintained:

|  | Temperature, ° F. | Reaction time, seconds, in gas phase |
|---|---|---|
| Coking and gasification zone | 1,500 | 1 |
| Combustion and water gas reaction zone | 1,800 | 5 |

As indicated above, air or oxygen can be charged to the combustion and water gas reaction zone. Inasmuch as air is much less expensive than oxygen, it is preferred. Nitrogen introduced along with oxygen of the air is removed from the system as one of the product gases. The dilution effect of nitrogen upon the prime product gases, carbon monoxide and hydrogen, is small and the total product gases have a satisfactorily high heating value for use directly in industrial or utility plants, or can be blended with other gases before put to such use.

I claim:

1. The process which comprises: passing a hot granular solid downwardly in series through a reactor comprising successively a heat exchange zone, a combustion and water gas reaction zone, a coking and gasification zone, and a cooling and steam generation zone; passing water in direct contact with said solid in said cooling and steam generation zone at a temperature below about 1000° F., whereby steam is generated and flows upwardly through said reactor countercurrent to said solid; passing a hydrocarbon in direct contact with said solid in said coking and gasification zone, at a temperature between about 1000° F. and about 2000° F., and for a contact time between about 0.1 second and about 10 seconds, whereby said hydrocarbon fraction is gasified and flows upwardly through said reactor countercurrent to said solid; passing oxygen-containing gas in direct contact with said solid in said combustion and water gas reaction zone at a temperature between about 1200° F. and about 2500° F. and for a contact time between about 0.5 second and about one minute, the amount of oxygen-containing gas so introduced being insufficient to cause complete combustion of said hydrocarbon gas passing upwardly through the reactor from said coking and gasification zone, said oxygen containing gas, hydrocarbon gas and carbon deposited on said solid reacting to form a product predominantly comprised of carbon monoxide and hydrogen, said product flowing upwardly through said reactor countercurrent to said solid through said heat exchange zone; and removing said product from an upper section of said reactor above said heat exchange zone.

2. The process defined by claim 1, wherein the liquid hydrocarbon fraction is a fuel oil having a boiling range about about 800° F.

3. The process defined by claim 1, wherein the oxygen-containing gas is oxygen.

4. The process defined by claim 1 wherein the temperature in said coking and gasification zone is between about 1200° F. and about 1700° F.

5. The process defined by claim 1 wherein the temperature in said combustion and water gas reaction zone is between about 1600° F. and about 2000° F.

LOUIS P. EVANS.

No references cited.